(12) United States Patent
Wang

(10) Patent No.: US 11,048,906 B2
(45) Date of Patent: *Jun. 29, 2021

(54) METHOD AND APPARATUS FOR FINGERPRINT IDENTIFICATION AND TERMINAL DEVICE

(71) Applicant: SHENZHEN GOODIX TECHNOLOGY CO., LTD., Shenzhen (CN)

(72) Inventor: Qiji Wang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,390

(22) Filed: Mar. 27, 2020

(65) Prior Publication Data

US 2020/0265208 A1 Aug. 20, 2020

Related U.S. Application Data

(63) Continuation of application No. PCT/CN2019/075601, filed on Feb. 20, 2019.

(51) Int. Cl.
*G06K 9/00* (2006.01)
*H01L 27/32* (2006.01)
*H04M 1/72454* (2021.01)

(52) U.S. Cl.
CPC ....... *G06K 9/0004* (2013.01); *G06K 9/00026* (2013.01); *H01L 27/323* (2013.01); *H04M 1/72454* (2021.01); *H04M 2250/12* (2013.01); *H04M 2250/22* (2013.01)

(58) Field of Classification Search
CPC ........... G06K 9/0004; G06K 9/00026; H04M 1/72454; H04M 2250/12; H04M 2250/22; H01L 27/323
USPC ....................................................... 382/124
See application file for complete search history.

(56) References Cited

U.S. PATENT DOCUMENTS

2004/0264747 A1* 12/2004 Hata ................. G06K 9/00026
382/124
2018/0218195 A1 8/2018 Sheik-Nainar et al.

FOREIGN PATENT DOCUMENTS

CN 107194331 A 9/2017
CN 108810242 A 11/2018

* cited by examiner

*Primary Examiner* — Abdul-Samad A Adediran
(74) *Attorney, Agent, or Firm* — Scully Scott Murphy & Presser

(57) ABSTRACT

Embodiments of the present application provide a method for fingerprint identification, which could reduce power consumption generated in the process of fingerprint identification. The method includes: capturing an optical signal, where the optical signal includes an optical signal, in an illumination region of a display screen, illuminating on a finger and reflected by the finger, the illuminating region is determined according to a pressing region within a fingerprint capturing region in which the finger performs a fingerprint pressing operation, and an area of the illuminating region is smaller than an area of the fingerprint capturing region; and performing fingerprint identification according to the optical signal.

15 Claims, 7 Drawing Sheets

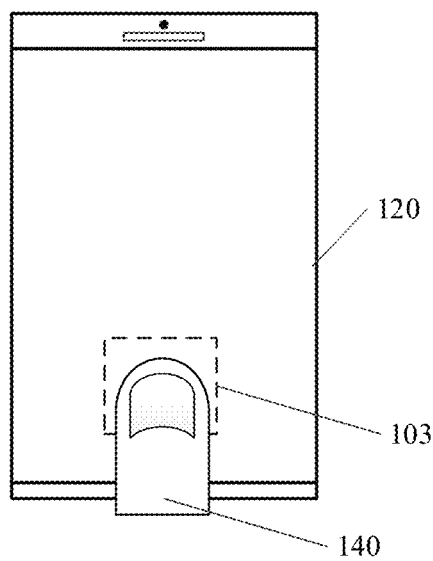
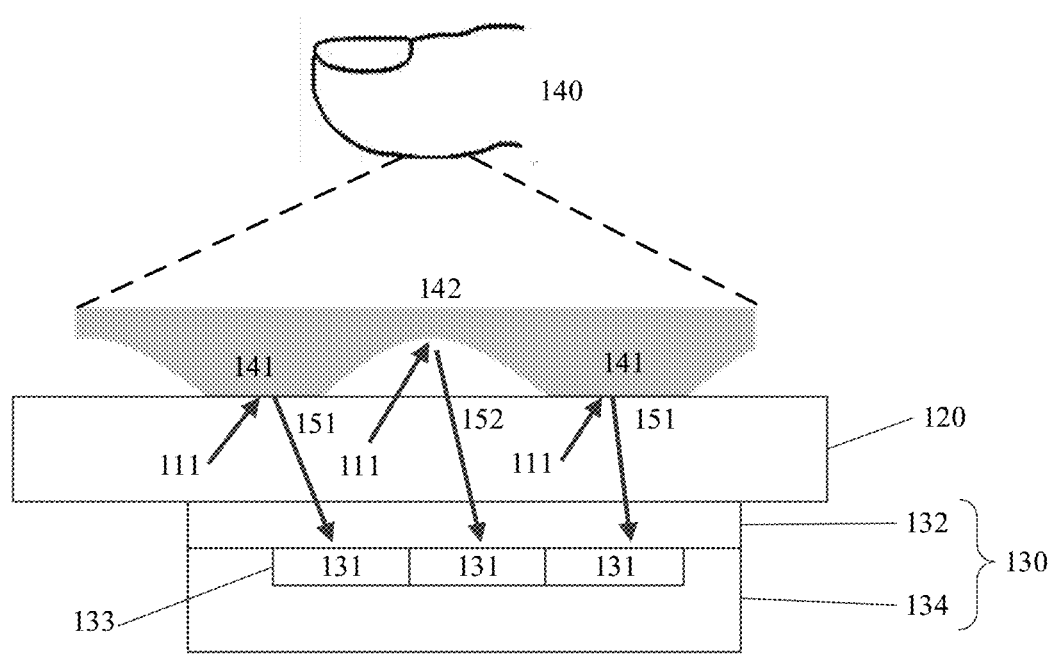
FIG. 1

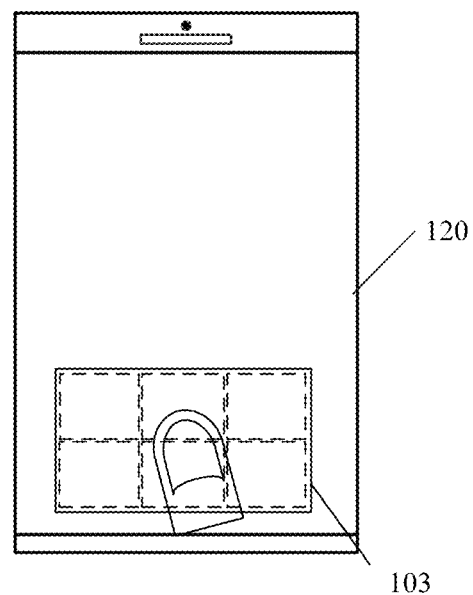
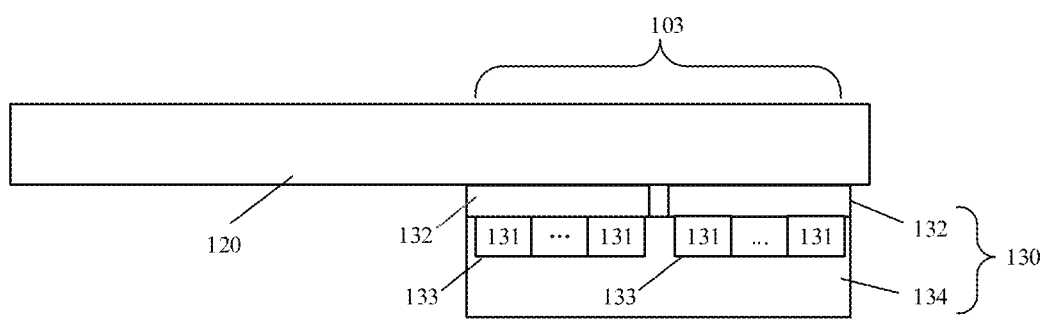
FIG. 2

300

Capturing an optical signal, wherein the optical signal comprises an optical signal, in an illumination region of a display screen, illuminating on a finger and reflected by the finger, the illuminating region is determined according to a pressing region within a fingerprint capturing region in which the finger performs a fingerprint pressing operation, and an area of the illuminating region is not greater than an area of the fingerprint capturing region — 310

Performing fingerprint identification according to the optical signal — 320

FIG. 3

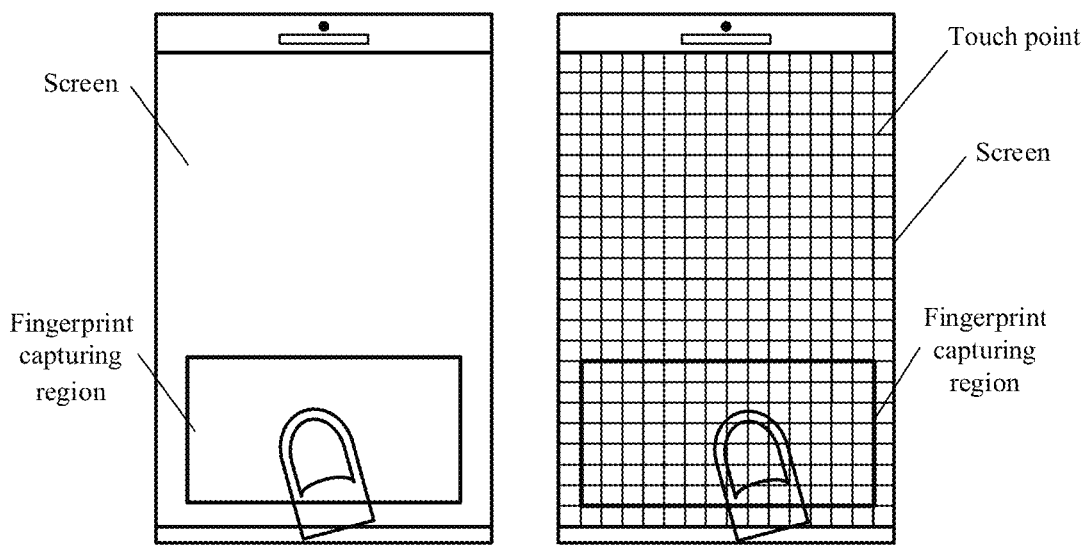

FIG. 4(a)   FIG. 4(b)

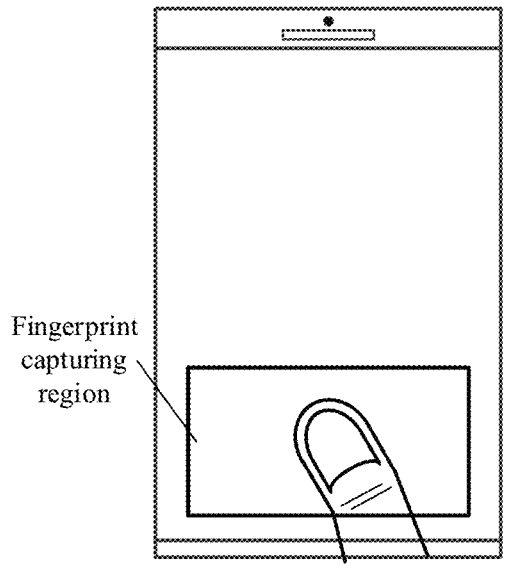 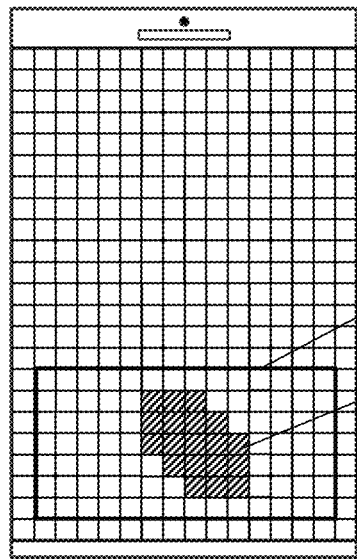
FIG. 5(a)　　　　FIG. 5(b)
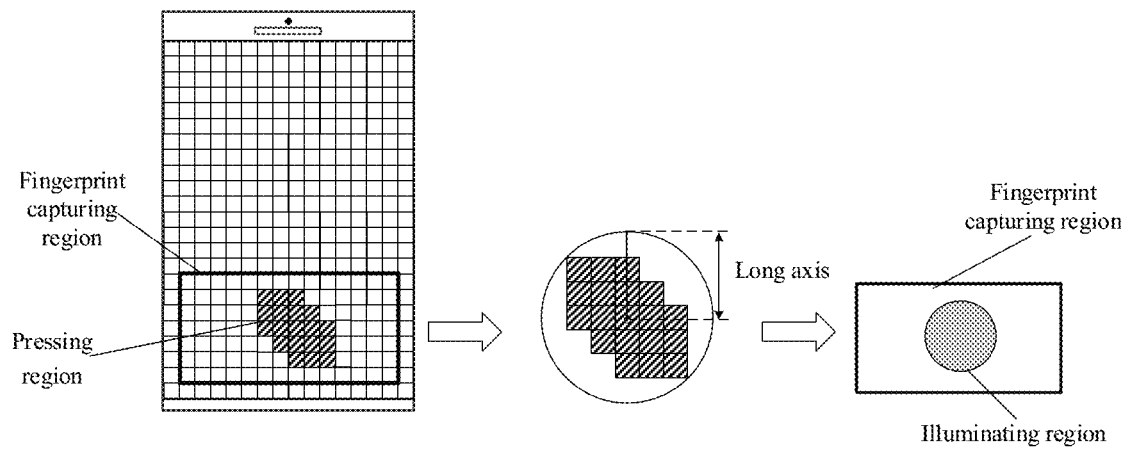
FIG. 6
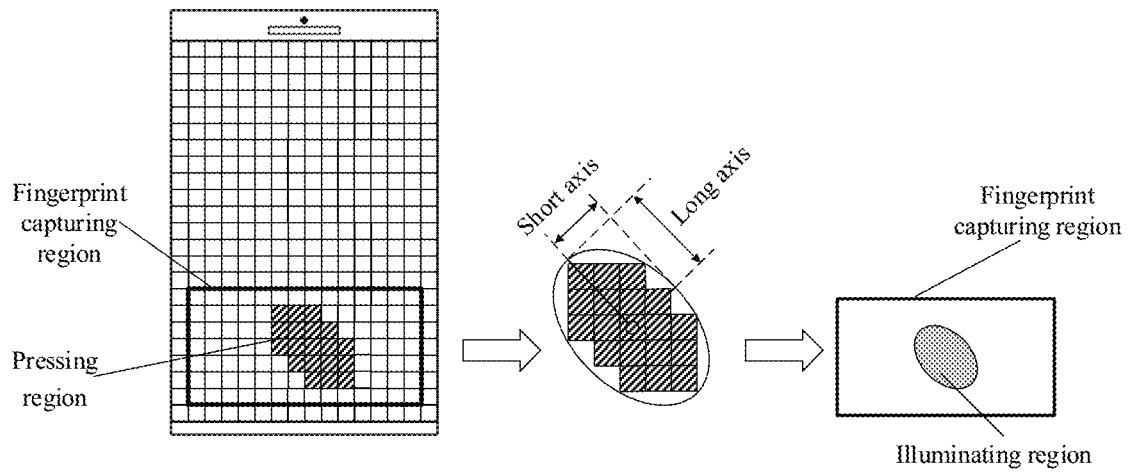
FIG. 7

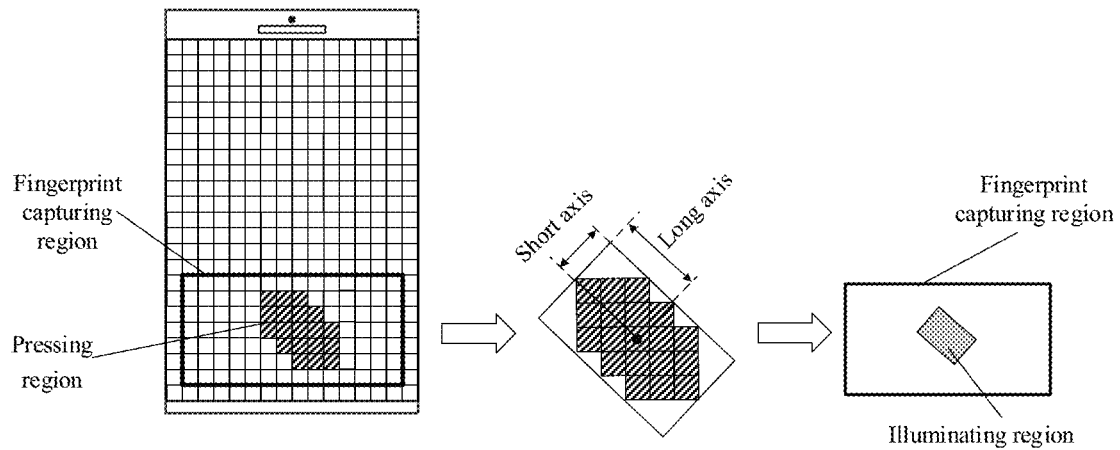

```
┌─────────────────────────────────────────────┐
│ Acquiring a fingerprint processing region,  │
│ where the fingerprint processing region is  │
│ determined according to a pressing region   │ 910
│ within a fingerprint capturing region in    │
│ which a finger performs a fingerprint       │
│ pressing operation, and an area of the      │
│ fingerprint processing region is smaller    │
│ than or equal to an area of the fingerprint │
│ capturing region                            │
└─────────────────────────────────────────────┘
                      │
┌─────────────────────────────────────────────┐
│ Selecting fingerprint data in the           │
│ fingerprint processing region from          │ 920
│ fingerprint data carried by an optical      │
│ signal captured in the fingerprint          │
│ capturing region                            │
└─────────────────────────────────────────────┘
                      │
┌─────────────────────────────────────────────┐
│ Performing fingerprint identification       │ 930
│ according to the fingerprint data in the    │
│ fingerprint processing region               │
└─────────────────────────────────────────────┘
```

FIG. 9

METHOD AND APPARATUS FOR FINGERPRINT IDENTIFICATION AND TERMINAL DEVICE

This application is a continuation of International Application No. PCT/CN2019/075601, filed on Feb. 20, 2019, the disclosure of which is hereby incorporated by reference in its entirety.

TECHNICAL FIELD

The present application relates to the field of fingerprint identification, and more particularly, to a method and apparatus for fingerprint identification and a terminal device.

BACKGROUND

Optical under-screen fingerprint identification technology refers that an optical fingerprint sensor captures reflected light formed by reflection of a finger over light emitted by a light source, where the reflected light carries fingerprint information of the finger, so as to implement under-screen fingerprint identification. In order to capture high-quality fingerprint data, screen light can be used to enhance an optical signal reflected by the finger, thereby improving the success rate of fingerprint identification.

In order to improve user experience, the size of an optical fingerprint identification apparatus is gradually increasing. Therefore, a larger area of screen light is required as a light source for fingerprint identification, which leads to an increase in screen power consumption and affects beauty of a device.

SUMMARY

Embodiments of the present application provide a method and apparatus for fingerprint identification and a terminal device, which could reduce power consumption generated in the process of fingerprint identification.

In a first aspect, provided is a method for fingerprint identification, including: capturing an optical signal, where the optical signal includes an optical signal, in an illumination region of a display screen, illuminating on a finger and reflected by the finger, the illuminating region is determined according to a pressing region within a fingerprint capturing region in which the finger performs a fingerprint pressing operation, and an area of the illuminating region is not greater than an area of the fingerprint capturing region; and performing fingerprint identification according to the optical signal.

Therefore, when fingerprint identification is performed, an illuminating region of a display screen is determined according to a pressing region of a finger on the display screen, so that a light-emitting unit of the display screen in the illuminating region is used as a light source for fingerprint identification, rather than using light emitting units in the whole fingerprint capturing region as light sources for fingerprint identification, thereby reducing power consumption. In addition, by using the light-emitting unit of the display screen in the illuminating region as the light source for fingerprint identification, light leakage generated during fingerprint capturing could be reduced and beauty of an interface is improved.

In one possible implementation manner, the illuminating region is an elliptical region obtained by performing graphic fitting based on a center point of the pressing region, a long axis of the pressing region and a short axis of the pressing region.

In one possible implementation manner, the fingerprint processing region is a circular region obtained by performing graphic fitting based on a center point of the pressing region and a long axis of the pressing region.

Given a shape characteristic of a finger, when the finger performs a fingerprint pressing operation in a fingerprint capturing region, a shape of a pressing region of the fingerprint pressing operation is generally approximately circular or elliptical. Therefore, fitting an elliptical or circular illuminating region according to the pressing region is not only easy to realize, but also facilitates forming of an illuminating region with the smallest area that covers the pressing region, thereby further reducing power consumption of a display screen.

In one possible implementation manner, the performing fingerprint identification according to the optical signal includes: selecting fingerprint data in the illuminating region from fingerprint data carried by the optical signal captured in the fingerprint capturing region; and performing fingerprint identification according to the fingerprint data in the illuminating region.

In one possible implementation manner, the performing fingerprint identification according to the optical signal includes: selecting fingerprint data in the pressing region from fingerprint data carried by the optical signal captured in the fingerprint capturing region; and performing fingerprint identification according to the fingerprint data in the pressing region.

Since the area of the pressing region and the area of the illuminating region are smaller than the area of the fingerprint capturing region, fingerprint data in the pressing region or the illuminating region is selected from fingerprint data in the fingerprint capturing region, and fingerprint identification is performed according to the fingerprint data in the pressing region or the illuminating region, so that an amount of the fingerprint data processed by a fingerprint identification apparatus is smaller, a fingerprint identification efficiency is enhanced, and user experience is improved.

In one possible implementation manner, the fingerprint capturing region includes sensing regions of at least two fingerprint sensor chips.

In a second aspect, provided is a method for fingerprint identification, including: acquiring a fingerprint processing region, where the fingerprint processing region is determined according to a pressing region within a fingerprint capturing region in which a finger performs a fingerprint pressing operation, and an area of the fingerprint processing region is not greater than an area of the fingerprint capturing region; selecting fingerprint data in the fingerprint processing region from fingerprint data carried by an optical signal captured in the fingerprint capturing region; and performing fingerprint identification according to the fingerprint data in the fingerprint processing region.

Since the area of the fingerprint processing region is smaller than the area of the fingerprint capturing region, fingerprint data in the fingerprint processing region is selected from fingerprint data in the fingerprint capturing region, and fingerprint identification is performed according to the fingerprint data in the fingerprint processing region, so that an amount of the fingerprint data processed by a fingerprint identification apparatus is smaller, a fingerprint identification efficiency is enhanced, and user experience is improved.

In one possible implementation manner, the fingerprint processing region is the pressing region.

In one possible implementation manner, the fingerprint processing region is an elliptical region obtained by performing graphic fitting based on a center point of the pressing region, a long axis of the pressing region and a short axis of the pressing region.

In one possible implementation manner, the fingerprint processing region is a circular region obtained by performing graphic fitting based on a center point of the pressing region and a long axis of the pressing region.

In one possible implementation manner, the fingerprint capturing region includes sensing regions of at least two fingerprint sensor chips.

In a third aspect, provided is an apparatus for fingerprint identification, including:

a capturing unit configured to capture an optical signal, where the optical signal includes an optical signal, in an illuminating region of the display screen, illuminating on a finger and reflected by the finger, the illuminating region is determined according to a pressing region within a fingerprint capturing region in which the finger performs a fingerprint pressing operation, and an area of the illuminating region is not greater than an area of the fingerprint capturing region; and a fingerprint identification unit configured to perform fingerprint identification according to the optical signal captured by the capturing unit.

In one possible implementation manner, the illuminating region is an elliptical region obtained by performing graphic fitting based on a center point of the pressing region, a long axis of the pressing region and a short axis of the pressing region.

In one possible implementation manner, the illuminating region is a circular region obtained by performing graphic fitting based on a center point of the pressing region and a long axis of the pressing region.

In one possible implementation manner, the fingerprint identification unit is configured to: select fingerprint data in the illuminating region from fingerprint data carried by the optical signal captured in the fingerprint capturing region; and perform fingerprint identification according to the fingerprint data in the illuminating region.

In one possible implementation manner, the fingerprint identification unit is configured to: select fingerprint data in the pressing region from fingerprint data carried by the optical signal captured in the fingerprint capturing region; and perform fingerprint identification according to the fingerprint data in the pressing region.

In one possible implementation manner, the fingerprint capturing region includes sensing regions of at least two fingerprint sensor chips.

In a fourth aspect, provided is an apparatus for fingerprint identification, including:

an acquiring unit configured to acquire a fingerprint processing region, where the fingerprint processing region is determined according to a pressing region within a fingerprint capturing region in which a finger performs a fingerprint pressing operation, and an area of the fingerprint processing region is not greater than an area of the fingerprint capturing region;

a data processing unit configured to select fingerprint data in the fingerprint processing region from fingerprint data carried by an optical signal captured in the fingerprint capturing region;

and a fingerprint identification unit configured to perform fingerprint identification according to the fingerprint data in the fingerprint processing region.

In one possible implementation manner, the fingerprint processing region is the pressing region.

In one possible implementation manner, the fingerprint processing region is an elliptical region obtained by performing graphic fitting based on a center point of the pressing region, a long axis of the pressing region and a short axis of the pressing region.

In one possible implementation manner, the fingerprint processing region is a circular region obtained by performing graphic fitting based on a center point of the pressing region and a long axis of the pressing region.

In one possible implementation manner, the fingerprint capturing region includes sensing regions of at least two fingerprint sensor chips.

In a fifth aspect, provided is a chip for implementing the method according to the above first aspect or any possible implementation manner of the first aspect. Specifically, the chip includes a processor for invoking and running a computer program from a memory, so that a device installed with the chip executes the method according to the above first aspect or any possible implementation manner of the first aspect.

In a sixth aspect, provided is a chip for implementing the method according to the above second aspect or any possible implementation manner of the second aspect. Specifically, the chip includes a processor for invoking and running a computer program from a memory, so that a device installed with the chip executes the method according to the above second aspect or any possible implementation manner of the second aspect.

In a seventh aspect, provided is a computer-readable storage medium for storing a computer program that causes a computer to execute the method according to the above first aspect or any possible implementation manner of the first aspect.

In an eighth aspect, provided is a computer-readable storage medium for storing a computer program that causes a computer to execute the method according to the above second aspect or any possible implementation manner of the second aspect.

In a ninth aspect, provided is a terminal device, including the apparatus for fingerprint identification apparatus according to the third aspect or any possible implementation manner of the third aspect, or the apparatus for fingerprint identification according to the fourth aspect or any possible implementation manner of the fourth aspect.

In one possible implementation manner, the terminal device further includes an OLED display screen, and a light-emitting layer of the display screen includes a plurality of organic light-emitting diode light sources, where the terminal device employs an organic light-emitting diode light source located in an illuminating region as a light source for fingerprint identification.

BRIEF DESCRIPTION OF THE DRAWINGS

FIG. 1 is a structural schematic diagram of an electronic device to which the present application is applicable.

FIG. 2 is a structural schematic diagram of an electronic device to which the present application is applicable.

FIG. 3 is a schematic flowchart of a method for fingerprint identification according to an embodiment of the present application.

FIGS. 4(a) and 4(b) are schematic diagrams of a screen according to an embodiment of the present application.

FIGS. 5(a) and 5(b) are schematic diagrams of a pressing region according to an embodiment of the present application.

FIG. 6 is a schematic diagram of determining an illuminating region according to an embodiment of the present application.

FIG. 7 is a schematic diagram of determining an illuminating region according to an embodiment of the present application.

FIG. 8 is a schematic diagram of determining an illuminating region according to an embodiment of the present application.

FIG. 9 is a schematic flowchart of a method for fingerprint identification according to an embodiment of the present application.

DESCRIPTION OF EMBODIMENTS

Figure 10:
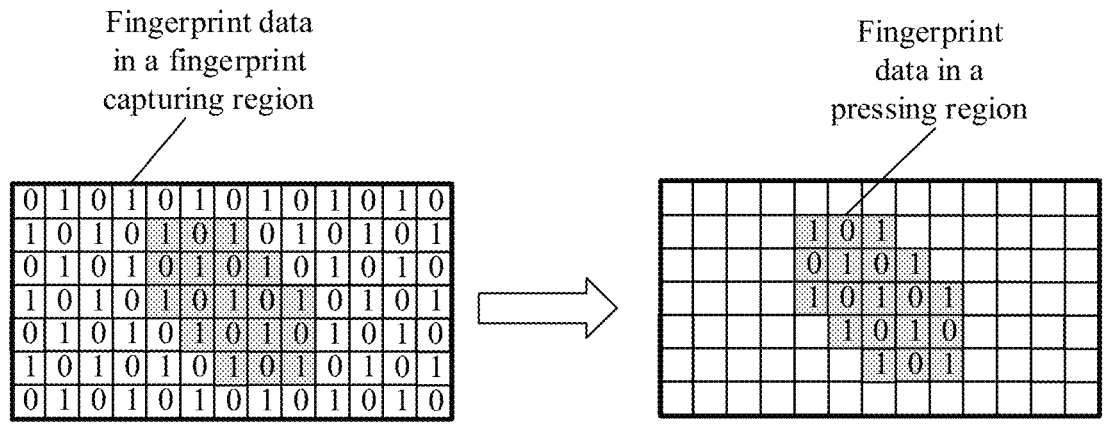
FIG. 10 is a schematic diagram of a fingerprint processing region according to an embodiment of the present application.

Technical solutions in embodiments of the present application will be described hereinafter in conjunction with the accompanying drawings.

It should be understood that embodiments of the present application may be applied to an optical fingerprint system, including but not limited to an optical fingerprint identification system and a medical diagnostic product based on optical fingerprint imaging. The embodiments of the present application are only described by taking the optical fingerprint system as an example, however, the example should not constitute any limitation to the embodiments of the present application, and the embodiments of the present application are also applicable to other systems using an optical imaging technology or the like.

As a common application scenario, the optical fingerprint system provided in the embodiments of the present application may be applied to a smart phone, a tablet computer, and other mobile terminals having display screens or other terminal devices. More specifically, in the foregoing terminal device, a fingerprint identification apparatus may be specifically an optical fingerprint apparatus, which may be disposed in a partial region or an entire region under a display screen, thereby forming an under-display or under-screen optical fingerprint system. Alternatively, the fingerprint identification apparatus may also be partially or entirely integrated into the interior of the display screen of the terminal device to form an in-display or in-screen optical fingerprint system.

FIG. 1 shows a structural schematic diagram of a terminal device to which an embodiment of the present application is applicable. The terminal device 10 includes a display screen 120 and an optical fingerprint apparatus 130, where the optical fingerprint apparatus 130 is disposed in a local region under the display screen 120. The optical fingerprint apparatus 130 includes an optical fingerprint sensor including a sensing array 133 having a plurality of optical sensing units 131. A region where the sensing array is located or a sensing region of the sensing array is a fingerprint capturing region 103 of the optical fingerprint apparatus 130. As shown in FIG. 1, the fingerprint capturing region 103 is located within a display region of the display screen 120. In an alternative embodiment, the optical fingerprint apparatus 130 may also be disposed at other positions, such as a side of the display screen 120 or an edge non-light transmissive region of the terminal device 10, and an optical signal of at least part of the display region of the display screen 120 is directed to the optical fingerprint apparatus 130 through a light path design, such that the fingerprint capturing region 103 is actually located in the display region of the display screen 120.

It should be understood that an area of the fingerprint capturing region 103 may be different from an area of the sensing array of the optical fingerprint apparatus 130. For example, the area of the fingerprint capturing region 103 of the optical fingerprint apparatus 130 may be greater than the area of the sensing array of the optical fingerprint apparatus 130 through a lens imaging light path design, a reflective folding light path design or other light path designs such as light convergence or reflection. In other alternative implementation manners, if the light path is directed in a manner of, for example, light collimation, the area of the fingerprint capturing region 103 of the optical fingerprint apparatus 130 may also be designed to be substantially identical with the area of the sensing array of the optical fingerprint apparatus 130.

Therefore, when a user needs to unlock the terminal device or perform other fingerprint verification, fingerprint input may be achieved merely by pressing a finger on the fingerprint capturing region 103 in the display screen 120. Since fingerprint detection may be implemented in the display screen, there is no need to exclusively reserve space for a front surface of the terminal device 10 in the foregoing structure to set a fingerprint button (such as a Home button), so that a full screen solution may be adopted; that is, the display region of the display screen 120 may be basically extended to an entire front surface of the terminal device 10.

As an optional implementation manner, as shown in FIG. 1, the optical fingerprint apparatus 130 includes a light detecting portion 134 and an optical component 132. The light detecting portion 134 includes the sensing array, as well as a readout circuit electrically connected to the sensing array and other auxiliary circuits, and may be fabricated on a die such as an optical imaging chip or an optical fingerprint sensor by a semiconductor process. The sensing array 133 is specifically an array of photo detectors including a plurality of photo detectors distributed in an array, and the photo detectors may serve as the optical sensing units as described above. The optical component 132 may be disposed above the sensing array of the light detecting portion 134, and may specifically include a filter, a light directing layer or a light path directing structure, and other optical elements. The filter may be used to filter ambient light penetrating through a finger, and the light directing layer or the light path directing structure is mainly used to direct reflected light reflected from a finger surface to the sensing array for optical detection.

In a specific implementation, the optical component 132 and the light detecting portion 134 may be encapsulated in the same optical fingerprint unit. For example, the optical component 132 and the light detecting portion 134 may be encapsulated in the same optical fingerprint chip, or the optical component 132 may be disposed outside a chip where the light detecting portion 134 is located, for example, the optical component 132 is attached above the chip, or a part of elements of the optical component 132 are integrated into the chip.

There are various implementations for the light directing layer or the light path directing structure of the optical component 132, for example, the light directing layer may be specifically a collimator layer fabricated on a semiconductor silicon wafer, which has a plurality of collimating units or micro-pore arrays, and the collimating unit may be a hole. Light in the reflected light reflected from the finger that is vertically incident to the collimating unit may pass through the collimating unit and be received by the optical sensing unit below it. However, light with an overlarge incident angle is attenuated through multiple reflection inside the collimating unit, therefore, each optical sensing unit may basically only receive the reflected light reflected from a fingerprint pattern right above the optical sensing unit, and thus the sensing array may detect a fingerprint image of the finger.

In another implementation, the light directing layer or the light path directing structure may also be an optical lens layer having one or more lens units, for example, a lens group composed of one or more aspheric lenses, for converging reflected light reflected from the finger to the sensing array of the light detecting portion 134 below it, so that the sensing array may perform imaging based on the reflected light so as to obtain the fingerprint image of the finger. Optionally, the optical lens layer may be further formed with pinholes in the light path of the lens unit, and the pinholes may cooperate with the optical lens layer to expand the field of view of the optical fingerprint apparatus, to improve a fingerprint imaging effect of the optical fingerprint apparatus 130.

In other implementations, the light directing layer or the light path directing structure may also specifically adopt a micro-lens layer having a micro-lens array composed of a plurality of micro-lenses, which may be formed above the sensing array of the light detecting portion 134 by a semiconductor growth process or other processes, and each micro-lens may correspond to one of the sensing units in the sensing array respectively. Moreover, other optical film layers such as a medium layer or a passivation layer may be formed between the micro-lens layer and the sensing unit. More specifically, a light shielding layer (or referred to as a light blocking layer) having micro-pores may be further included between the micro-lens layer and the sensing unit, where the micro-pores are formed between the corresponding micro-lens and sensing units, and the light shielding layer may block optical interference between adjacent micro-lenses and the sensing units, such that light corresponding to the sensing unit is converged to the interior of the micro-pore through the micro-lens and is transmitted to the sensing unit via the micro-pore to perform optical fingerprint imaging.

It should be understood that several implementations of the foregoing light directing layer or the light path directing structure may be used alone or in combination. For example, a micro-lens layer may be further disposed above or below the collimator layer or the optical lens layer. Certainly, when the collimator layer or the optical lens layer is used in combination with the micro-lens layer, the specific laminated structure or light path may require to be adjusted according to actual needs.

As an optional implementation manner, the display screen 120 may adopt a display screen with a self-emitting display unit, for example, an organic light-emitting diode (OLED) display screen or a micro light-emitting diode (Micro-LED) display screen. As an example, when an OLED display screen is adopted, the optical fingerprint apparatus 130 may use a display unit (that is, an OLED light source) of the OLED display screen 120 in the fingerprint capturing region 103 as an excitation light source for optical fingerprint detection. When a finger 140 is pressed against the fingerprint capturing region 103, the display screen 120 emits a beam of light 111 to the target finger 140 above the fingerprint capturing region 103, and the light 111 is reflected by a surface of the finger 140 to form reflected light or scattered inside the finger 140 to form scattered light. In related patent applications, the reflected light and the scattered light are collectively referred to as reflected light for convenience of description. Since a ridge 141 and a valley 142 of a fingerprint have different reflecting capabilities over light, reflected light 151 from the ridge of the fingerprint and reflected light 152 from the valley of the fingerprint have different light intensities. After passing through the optical component 132, the reflected light is received by the sensing array 133 in the optical fingerprint apparatus 130 and converted into corresponding electrical signal, that is, a fingerprint detection signal; and fingerprint image data may be obtained based on the fingerprint detection signal, and fingerprint matching verification may be further performed, thereby implementing an optical fingerprint identification function at the terminal device 10.

In other implementation manners, the optical fingerprint apparatus 130 may also use an internal light source or an external light source to provide an optical signal for fingerprint detection. In this case, the optical fingerprint apparatus 130 may be applied to a non-self-emitting display screen, such as a liquid crystal display screen or other passive light-emitting display screens. As an example, in a case of application to a liquid crystal display screen having a backlight module and a liquid crystal panel, in order to support under-screen fingerprint detection of the liquid crystal display screen, the optical fingerprint system of the terminal device 10 may further include an excitation light source for optical fingerprint detection. The excitation light source may specifically be an infrared light source or a light source of non-visible light at a specific wavelength, which may be disposed under the backlight module of the liquid crystal display screen or disposed in an edge region under a protective cover of the terminal device 10. The optical fingerprint apparatus 130 may be disposed under the liquid crystal panel or the edge region of the protective cover, and light for fingerprint detection may reach the optical fingerprint apparatus 130 by being directed by a light path. Alternatively, the optical fingerprint apparatus 130 may also be disposed under the backlight module, and the backlight module allows the light for fingerprint detection to pass through the liquid crystal panel and the backlight module and reach the optical fingerprint apparatus 130 by providing a hole on film layers such as a diffusion sheet, a brightening sheet, a reflection sheet or the like, or by performing other optical designs. When the optical fingerprint apparatus 130 uses an internal light source or an external light source to provide an optical signal for fingerprint detection, a detection principle is consistent with the foregoing description.

It should be understood that, in specific implementation, the terminal device 10 further includes a transparent protective cover, and the cover may be a glass cover or a sapphire cover, which is located above the display screen 120 and covers a front surface of the terminal device 10. Therefore, in an embodiment of the present application, the so-called finger being pressed against the display screen 120 actually refers to the finger being pressed against the cover above the display screen 120 or a surface of the protective layer covering the cover.

In some embodiments, the optical fingerprint apparatus 130 may only include one optical fingerprint sensor, and in this case, the fingerprint capturing region 103 of the optical fingerprint apparatus 130 has a smaller area and a fixed position, and therefore, the user needs to press the finger at a specific position of the fingerprint capturing region 103 when a fingerprint input is performed, otherwise the optical fingerprint apparatus 130 may not be able to capture the fingerprint image, thereby resulting in a poor user experience.

In other embodiments, the optical fingerprint apparatus 130 may specifically include a plurality of optical fingerprint sensors. The plurality of optical fingerprint sensors may be disposed under the display screen 120 side by side in a splicing manner, and sensing regions of the plurality of optical fingerprint sensors collectively constitute the fingerprint capturing region 103 of the optical fingerprint apparatus 130. In other words, the fingerprint capturing region 103 of the optical fingerprint apparatus 130 may include a plurality of sub-regions, each sub-region corresponds to a sensing region of one of the optical fingerprint sensors, respectively, so that the fingerprint capturing region 103 of the optical fingerprint apparatus 130 may be extended to a main region of a lower portion of the display screen, that is, to a region generally pressed by the finger, so as to achieve a blind pressing type of fingerprint input operation. Alternatively, when the number of optical fingerprint sensors is sufficient, the fingerprint capturing region 103 may also be extended to half of the display region or even the entire display region, thereby achieving half-screen or full-screen fingerprint detection.

FIG. 2 shows a schematic diagram of an optical fingerprint apparatus 130 including a plurality of optical fingerprint sensors. The plurality of optical fingerprint sensors may be disposed under a display screen 120 side by side in a manner such as splicing, and sensing regions of the plurality of optical fingerprint sensors collectively constitute a fingerprint capturing region 103 of the optical fingerprint apparatus 130. That is, the fingerprint capturing region 103 of the optical fingerprint apparatus 130 may include a plurality of sub-regions, and each sub-region corresponds to an optical fingerprint sensor, or in other words, each sub-region corresponds to a sensing region of one of optical sensing arrays 133, respectively.

Optionally, corresponding to the plurality of optical fingerprint sensors of the optical fingerprint apparatus 130, an optical component 132 may include a plurality of light path directing structures, with each light path directing structure corresponding to one optical fingerprint sensor and being disposed to attach to the above of the corresponding optical fingerprint sensor, respectively. Alternatively, the plurality of optical fingerprint sensors may also share an integral light path directing structure, i.e., the light path directing structure has an area large enough to cover sensing arrays of the plurality of optical fingerprint sensors. In addition, the optical component 132 may further include other optical elements, for example, a filter or other optical films, which may be disposed between the light path directing structure and the optical fingerprint sensor, or between the display screen 120 and the light path directing structure, and are mainly used to isolate the influence of external interference light on optical fingerprint detection. Specifically, the filter may be used to filter out ambient light that penetrates through a finger and enters the display screen 120 into the optical fingerprint sensor. Similar to the light path directing structure, the filter may be separately provided on each of the optical fingerprint sensors for filtering interference light, or a filter having a large area may also be used to simultaneously cover the plurality of optical fingerprint sensors.

An optical path modulator may also be replaced by an optical lens (Lens), and an aperture may be formed by a light-shielding material above the optical lens to cooperate with the optical lens to converge fingerprint detection light to the optical fingerprint sensor under the optical lens so as to achieve fingerprint imaging. Similarly, each optical fingerprint sensor may be separately configured with an optical lens for fingerprint imaging, or the plurality of optical fingerprint sensors may also utilize the same optical lens to achieve light convergence and fingerprint imaging. In other alternative embodiments, each of the optical fingerprint sensors may even further have dual sensing arrays (Dual Array) or multiple sensing arrays (Multi-Array), and two or more optical lenses are simultaneously configured to cooperate with the two or more sensing arrays for optical imaging so as to reduce an imaging distance and enhance an imaging effect.

When the plurality of optical fingerprint sensors as shown in FIG. 2 are used for fingerprint identification, the fingerprint capturing region of the optical fingerprint apparatus is increased, and therefore, when screen light is used as a light source for fingerprint identification (or referred to as an excitation light source), the screen will emit light in the whole fingerprint capturing region for fingerprint identification, which causes an increase in screen power consumption and affects beauty of a device.

Embodiments of the present application provide a method and apparatus for fingerprint identification, which could reduce power consumption generated in the process of fingerprint identification.

Hereinafter, an optical fingerprint apparatus is also referred to as an optical fingerprint identification apparatus or a fingerprint identification apparatus, or the like; an optical fingerprint sensor is also referred to as a fingerprint sensor, an optical fingerprint sensor chip, a fingerprint sensor chip, or the like; and a fingerprint capturing region may also be referred to as a fingerprint detecting region, a fingerprint identifying region, or the like.

FIG. 3 is a schematic flowchart of a method for fingerprint identification 300 according to an embodiment of the present application. The method shown in FIG. 3 may be executed by a fingerprint identification apparatus. As shown in FIG. 3, the method includes some or all of the following steps.

In 310, an optical signal is captured.

The optical signal includes an optical signal, in an illumination region of a display screen, illuminating on a finger and reflected by the finger, and the illuminating region is determined according to a pressing region within a fingerprint capturing region in which the finger performs a fingerprint pressing operation.

Optionally, an area of the illuminating region is smaller than or equal to an area of the fingerprint capturing region.

Optionally, the illuminating region covers the pressing region.

In 320, fingerprint identification is performed according to the optical signal.

When fingerprint identification is performed, an illuminating region of a display screen is determined according to a pressing region of a finger on the display screen, so that a light-emitting unit of the display screen in the illuminating region is used as a light source for fingerprint identification, rather than using light emitting units in the whole fingerprint capturing region as light sources for fingerprint identification, thereby reducing power consumption of the display screen. In addition, since the illuminating region is determined based on the pressing region for the finger, the light-emitting unit of the display screen in the illuminating region is used as the light source for fingerprint identification, so that light leakage generated during fingerprint capturing could also be reduced and beauty of an interface is improved.

That is, a fingerprint identification apparatus can perform fingerprint identification according to an optical signal, in an illumination region of a display screen, illuminating on a finger and reflected by the finger. The display screen can only emit light in the illuminating region within a fingerprint identifying region, and does not emit light in other regions.

It should be understood that the description described in the embodiment of the present application that the display screen emits light in the illuminating region, and it means that the display screen emits light for fingerprint identification in the illuminating region, that is, the light emitted in the illuminating region is used for fingerprint identification. The display screen does not emit light in other display regions other than the illuminating region, which means that the display screen does not emit light for fingerprint identification in other regions, but the display screen can still emit light for functions such as image output and display in the other regions. In other words, the light emitted in other regions is not used for fingerprint identification, but is used to implement other functions instead of fingerprint identification. The light emitted in the illuminating region may have intensity and wavelength different from those of the light emitted in other regions. For example, the light intensity of light emitted in the illuminating region is significantly higher than that of light emitted in other regions of the display screen.

The illuminating region is determined according to a pressing region of a finger, and for example, an area of the illuminating region may be greater than or equal to an area of the pressing region but smaller than an area of the fingerprint capturing region. When the finger is pressed on the screen, the screen can acquire the pressing region of the finger, the pressing region is used to determine the illuminating region, and the illuminating region is used to determine which light-emitting units of the display screen are used as the light source for fingerprint identification, so as to emit light for fingerprint identification to the finger. The light emitted in the illuminating region is reflected by the finger and then captured by the fingerprint sensor in the fingerprint identification apparatus, so that fingerprint data can be obtained according to the captured optical signal, and fingerprint identification is completed based on the fingerprint data.

In the embodiment of the present application, the light source for fingerprint identification may include other extra light sources in addition to the light-emitting unit of the display screen in the illuminating region, which is not limited herein.

The screen in the embodiment of the present application may also be referred to as a screen component, which includes a touch screen and a display screen. The touch screen and the display screen may be placed on top of one another, for example, the touch screen is attached above the display screen.

The touch screen includes a plurality of touch points, and the touch screen may determine a finger pressing operation, such as a pressing position and a pressing intensity, according to a signal variation of each of the plurality of touch points. The touch screen may be, for example, a capacitive touch screen. When a finger is pressed on a fingerprint capturing region in the screen, the touch screen may determine a pressing region of the finger according to a capacitance variation on each touch point.

The display screen has a light-emitting layer including a plurality of light-emitting units, and a part of the light-emitting units can serve as an excitation source for fingerprint identification. The display screen may be a self-emitting display screen such as an OLED display screen, a light-emitting layer of the display screen includes a plurality of organic light-emitting diode light sources, and an organic light-emitting diode light source located in the illuminating region is used as an excitation source for fingerprint identification.

As an example, in a screen shown in FIG. 4(a) and FIG. 4(b), FIGS. 4(a) and 4(b) are top views of the screen. The screen includes a touch screen and a display screen, and the display screen is attached under the touch screen. The screen can sense a pressing operation of a finger and achieve other functions of the touch screen and the display screen. FIG. 4(a) shows a fingerprint capturing region of a fingerprint identification apparatus. The fingerprint capturing region is located at a lower part of a display region of the screen, and occupies most of regions of the lower part. The fingerprint identification apparatus can capture fingerprint information within the fingerprint capturing region. FIG. 4(b) shows every touch point on the screen. Each small square represents a touch point. When a finger is placed in the fingerprint capturing region, signal values on touch points touched by the finger will vary. Based on signal variations of these touch points on the screen, a pressing region for the finger can be determined.

Optionally, the fingerprint identification apparatus may include one or more fingerprint sensor chips. When the fingerprint identification apparatus includes a plurality of fingerprint sensor chips, for example, two fingerprint sensor chips, the fingerprint capturing region includes sensing regions of the plurality of fingerprint sensor chips.

An area of the fingerprint capturing region may be equal to a physical area occupied by sensing arrays of all the fingerprint sensor chips. Alternatively, an area of the fingerprint capturing region is allowed to be greater than a physical area occupied by sensing arrays of all the fingerprint sensor chips through a lens imaging light path design, a reflective folding light path design or other light path designs such as light convergence or reflection.

How to acquire an illuminating region in the embodiments of the present application is described with reference to FIG. 5 to FIG. 7.

The illuminating region may be determined by a screen, that is, a touch screen, according to a pressing region within a fingerprint capturing region in which a finger performs a fingerprint pressing operation; alternatively, the illuminating region may be determined by a processor, for example, a main processor of a terminal device, according to the pressing region; alternatively, the illuminating region may be determined by a fingerprint identification apparatus according to the pressing region. In the embodiment of the present application, the touch screen, the processor, the fingerprint identification apparatus, or the like may be used to determine the illuminating region, which is not limited herein.

For example, if the illuminating region is determined by a touch screen, a finger performs a pressing operation in a fingerprint identifying region, the touch screen determines a pressing region of the finger according to a signal variation of each touch point, and reports the pressing region as the illuminating region to a processor, and the processor controls a display screen to emit light in the illuminating region for fingerprint identification.

For another example, if the illuminating region is determined by a processor, a finger performs a pressing operation in a fingerprint identifying region, and a touch screen determines a pressing region for the finger according to a signal variation of each touch point, and reports information of the pressing region to a processor. The processor determines the illuminating region according to the information of the pressing region reported by the touch screen, and controls a display screen to emit light in the illuminating region for fingerprint identification.

For another example, if the illuminating region is determined by a fingerprint identification apparatus, a finger performs a pressing operation in a fingerprint identifying region, and a touch screen determines a pressing region for the finger according to a signal variation of each touch point, and reports information of the pressing region to the fingerprint identification apparatus. The fingerprint identification apparatus determines the illuminating region according to the information of the pressing region reported by the touch screen, and sends the information of the illuminating region to a processor, and the processor controls the display screen to emit light in the illuminating region. The light is reflected by the finger and then captured by the fingerprint identification apparatus. The fingerprint identification apparatus performs fingerprint identification according to the captured optical signal.

As an example, in FIG. 5(a), when a finger performs a pressing operation in a fingerprint capturing region, signal values of each touch point on a touch screen will vary. Based on these variations, the touch screen can determine a pressing region as shown in a shadow portion in FIG. 5(b). The pressing region can be directly used as an illuminating region of a display screen. Alternatively, graphic fitting may be performed on the pressing region to obtain an illuminating region having a specific shape.

Hereinafter, a process of determining an illuminating region is described in detail.

Optionally, graphic fitting may be performed based on a center point of the pressing region, a long axis of the pressing region and a short axis of the pressing region to obtain an elliptical illuminating region; alternatively, graphic fitting may be performed based on a center point of the pressing region and a long axis of the pressing region to obtain a circular illuminating region.

Preferably, the illuminating region obtained by performing graphic fitting based on the pressing region can cover the pressing region.

For example, as shown in FIG. 6, after a finger performs a pressing operation in a fingerprint capturing region and information of the corresponding pressing region is obtained, position of a center point of the pressing region and a long axis of the pressing region can be obtained, and then graphic fitting may be performed by using the position of the center point position as a center and the long axis as a radius to obtain a circular region. The circular region is thus the illuminating region.

For another example, as shown in FIG. 7, after a finger performs a pressing operation in a fingerprint capturing region and information of the corresponding pressing region is obtained, position of a center point of the pressing region, a long axis of the pressing region and a short axis of the pressing region can be obtained, and then graphic fitting may be performed based on the center point, the long axis and the short axis to obtain an elliptical region as shown in FIG. 7. The elliptical region is thus the illuminating region. It can be seen that when the pressing region is elliptical, the elliptical illuminating region shown in FIG. 7 basically overlaps with the pressing region, and the area of the illuminating region is substantially equal to the area of the pressing region, thereby minimizing power consumption.

Given a shape characteristic of a finger, when the finger performs a fingerprint pressing operation in a fingerprint capturing region, a shape of a pressing region for the fingerprint pressing operation is generally approximately circular or elliptical. Therefore, fitting an elliptical or circular illuminating region according to the pressing region is not only easy to realize, but also facilitates forming an illuminating region with the smallest area that covers the pressing region, thereby further reducing power consumption of a display screen.

However, the embodiment of the present application does not limit the shape of the illuminating region, and it may be circular or elliptical as described above, or rectangular, square, or other shapes of illuminating regions that can be fitted according to the pressing region, as long as the pressing region can be covered. For example, as shown in FIG. 8, an illuminating region obtained by performing fitting based on information of a pressing region such as a center, a long axis and a short axis of the pressing region may also be a rectangular region. In addition, an area of the illuminating region is not limited in the embodiment of the present application, as long as it is smaller than an area of the fingerprint capturing region.

After a fingerprint sensor captures an optical signal in the fingerprint capturing region, data processing may be performed according to fingerprint data carried in the optical signal. For example, pre-processing operations such as filtering, convolution and enhancement, image feature extraction, and other operations may be performed on these fingerprint data. The processed data may be used for fingerprint matching with a fingerprint template in a fingerprint database, and fingerprint identification may be completed according to the matching result. As the area of the fingerprint capturing region increases, more optical signals are captured correspondingly. If data carried in optical signals captured in the whole fingerprint capturing region are all processed, fingerprint identification efficiency will be affected.

Therefore, an embodiment of the present application further provides a method for fingerprint identification, which could improve fingerprint identification efficiency.

FIG. 9 shows a method for fingerprint identification according to an embodiment of the present application. The method may be executed by a fingerprint identification apparatus. As shown in FIG. 9, the method includes some or all of the following steps.

In 910, a fingerprint processing region is acquired.

The fingerprint processing region is determined according to a pressing region within a fingerprint capturing region in which a finger performs a fingerprint pressing operation.

Optionally, an area of the fingerprint processing region is smaller than or equal to an area of the fingerprint capturing region.

Optionally, the fingerprint processing region covers the pressing region.

In 920, fingerprint data in the fingerprint processing region is selected from fingerprint data carried by an optical signal captured in the fingerprint capturing region.

In 930, fingerprint identification is performed according to the fingerprint data in the fingerprint processing region.

In this embodiment, the optical signal captured in the fingerprint capturing region carries fingerprint data. A fingerprint identification apparatus selects fingerprint data in the fingerprint processing region from fingerprint data in the fingerprint capturing region according to the fingerprint processing region, and performs fingerprint identification according to the data in the fingerprint processing region. Since the area of the fingerprint processing region is smaller than the area of the fingerprint capturing region, an amount of the fingerprint data processed by the fingerprint identification apparatus is smaller, a fingerprint identification efficiency is enhanced, and user experience is improved.

Fingerprint data can be captured in the fingerprint capturing region, but not all of the fingerprint data carry enough fingerprint information, and fingerprint information of the finger is concentrated in and adjacent the finger pressing region. Therefore, the fingerprint data in the fingerprint processing region is sufficient for fingerprint identification.

The fingerprint processing region described in this embodiment may have the same shape as the illuminating region in the foregoing embodiments, for example, a circular region or an elliptical region covering the fingerprint pressing region. The fingerprint processing region may also have a shape different from that of the illuminating region in the foregoing embodiments, for example, the illuminating region is circular, and the fingerprint processing region is an elliptical region. In addition, the area of the illuminating region may be equal or not equal to that of the fingerprint processing region.

Preferably, the fingerprint processing region and the illuminating region are the same region. In this case, after the illuminating region is determined, the fingerprint processing region is also determined.

Optionally, the fingerprint processing region is the pressing region.

After acquiring the pressing region reported by a touch screen, the fingerprint identification apparatus can directly cut the fingerprint data in the fingerprint capturing region based on the pressing region to obtain the fingerprint data in the pressing region, and perform fingerprint identification based on the fingerprint data in the pressing region.

For example, as shown in FIG. 10, when a finger performs a pressing operation in a fingerprint capturing region, a touch screen can acquire a pressing region for the finger. The touch screen can report information of the pressing region to a fingerprint identification apparatus. The fingerprint identification apparatus cuts data carried by an optical signal captured in the fingerprint capturing region based on the pressing region to obtain fingerprint data in the pressing region as shown in FIG. 10. The fingerprint identification apparatus may perform fingerprint identification according to the fingerprint data in the pressing region.

Figure 11:
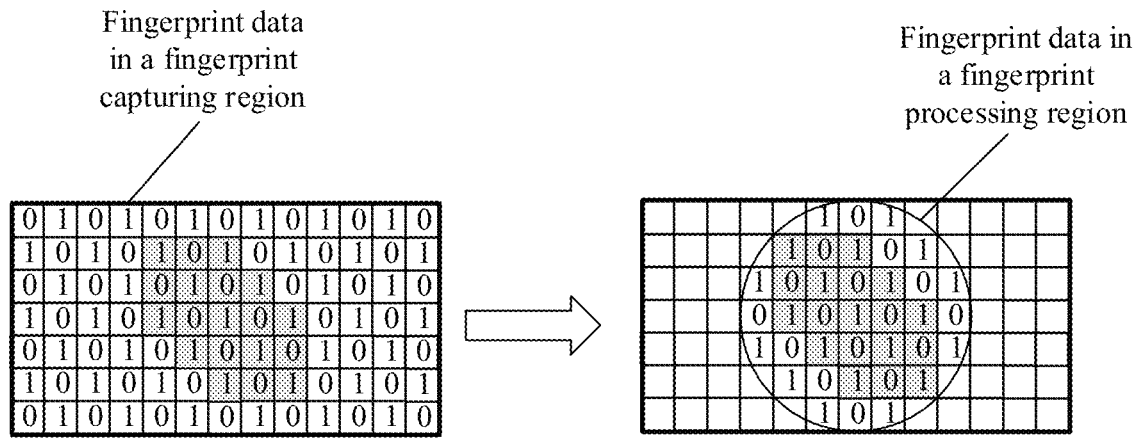
FIG. 11 is a schematic diagram of a fingerprint processing region according to an embodiment of the present application.
Figure 12:
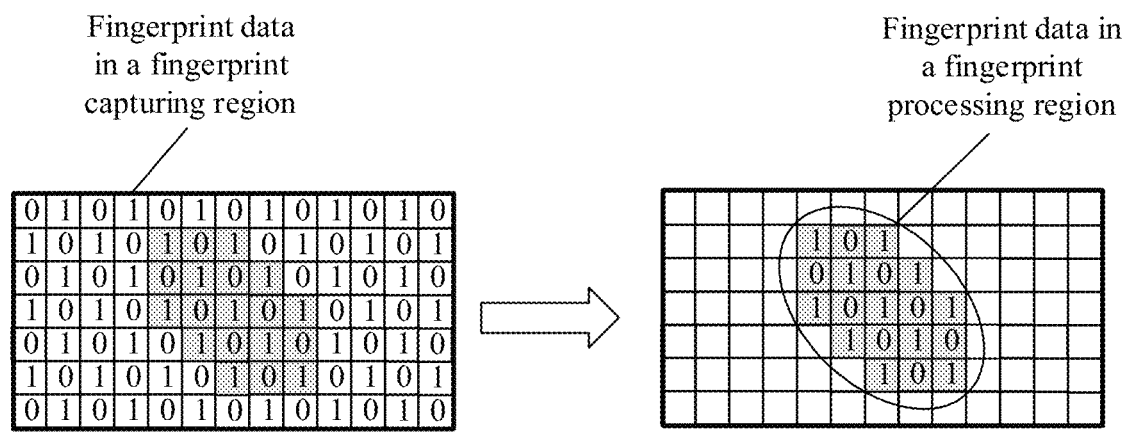
FIG. 12 is a schematic diagram of a fingerprint processing region according to an embodiment of the present application.

In FIG. 10 to FIG. 12, numbers 1 and 0 only indicate presence of data, rather than values of specific fingerprint data. Since an amount of data in an optical signal captured by a fingerprint sensor is much larger than that shown in the figure, 0 and 1 are used herein only to indicate presence of data at the corresponding positions for illustration. In actual applications, a value of fingerprint data in a pressing region is generally greater than a value of fingerprint data in a region outside the pressing region. The value of fingerprint data near the pressing region decreases as a distance from the pressing region increases. These fingerprint data may be, for example, grayscale values of various pixels in a fingerprint image obtained by imaging of a captured optical signal.

Optionally, graphic fitting may be performed based on a center point of the pressing region, a long axis of the pressing region, and a short axis of the pressing region to obtain an elliptical fingerprint processing region; alternatively, graphic fitting may be performed based on a center point of the pressing region and a long axis of the pressing region to obtain a circular fingerprint processing region.

Preferably, the fingerprint processing region obtained by performing graphic fitting based on the pressing region can cover the pressing region.

For example, as shown in FIG. 11, when a finger performs a pressing operation in a fingerprint capturing region, a touch screen can acquire a pressing region of the finger. The touch screen can report information of the pressing region, such as position of a center point of the pressing region and a long axis of the pressing region, to a fingerprint identification apparatus. The fingerprint identification apparatus performs graphic fitting by using the position of the center point as a center and the long axis as a radius to obtain a circular region. The circular region is thus the fingerprint processing region. The fingerprint identification apparatus can perform fingerprint identification according to fingerprint data in the circular region.

For another example, as shown in FIG. 12, when a finger performs a pressing operation in a fingerprint capturing region, a touch screen can acquire a pressing region for the finger. The touch screen can report information of the pressing region, such as position of a center point of the pressing region, a long axis of the pressing region and a short axis of the pressing region, to a fingerprint identification apparatus. The fingerprint identification apparatus performs graphic fitting based on the center point, the long axis and the short axis to obtain an elliptical region as shown in FIG. 12. The elliptical region is thus the fingerprint processing region. It can be seen that when the pressing region is elliptical, the elliptical fingerprint processing region shown in FIG. 12 basically overlaps with the pressing region, and the area of the fingerprint processing region is substantially equal to the area of the pressing region, thereby minimizing the data processing amount. The fingerprint identification apparatus performs fingerprint identification according to fingerprint data in the elliptical region.

Given a shape characteristic of a finger, when the finger performs a fingerprint pressing operation in a fingerprint capturing region, a shape of a pressing region for the fingerprint pressing operation is generally approximately circular or elliptical. Therefore, fitting an elliptical or circular fingerprint processing region according to the pressing region is not only easy to realize, but also facilitates forming a fingerprint processing region with the smallest area that covers the pressing region, thereby further reducing the processing amount of fingerprint data and improving fingerprint identification efficiency.

However, the embodiment of the present application does not limit the shape of the fingerprint processing region, and it may be circular or elliptical as described above, or rectangular, square, or other shapes of fingerprint processing regions that can be fitted according to the pressing region, as long as the pressing region can be covered. For example, the fingerprint processing region obtained by performing fitting based on information of a pressing region such as a center, a long axis and a short axis of the pressing region may also be a rectangular region, as referred to the illuminating region in FIG. 8. In addition, an area of the fingerprint processing region is not limited in the embodiment of the present application, as long as it is smaller than an area of the fingerprint capturing region.

In the embodiment of the present application, the method for fingerprint identification shown in FIG. 3 and the method for fingerprint identification shown in FIG. 9 can be implemented simultaneously.

Optionally, in 320, performing fingerprint identification according to the optical signal includes: selecting fingerprint data in the pressing region from fingerprint data carried by the optical signal captured in the fingerprint capturing region; and performing fingerprint identification according to the fingerprint data in the pressing region.

The optical signal captured in the fingerprint capturing region of the fingerprint identification apparatus includes an optical signal, in an illumination region of a display screen, illuminating on a finger and reflected by the finger. The fingerprint identification apparatus can obtain the fingerprint processing region according to information of the pressing region reported by a touch screen. The fingerprint identification apparatus cuts the fingerprint data carried by the optical signal captured in the fingerprint capturing region according to the fingerprint processing region, and performs fingerprint identification according to the obtained fingerprint data in the fingerprint processing region.

For example, a touch screen determines the illuminating region according to the pressing region and reports the illuminating region to a processor. The processor controls a light-emitting unit of the display screen in the illuminating region as a light source for fingerprint identification according to the illuminating region reported by the touch screen. In addition, the touch screen reports the illuminating region to the fingerprint identification apparatus, and the fingerprint identification apparatus uses the illuminating region as its fingerprint processing region, so as to perform fingerprint identification according to fingerprint data in the fingerprint processing region.

For another example, a processor determines the illuminating region according to the pressing region reported by a touch screen, and controls a light-emitting unit of the display screen in the illuminating region as a light source for fingerprint identification. In addition, the touch screen reports the pressing region to the fingerprint identification apparatus, and the fingerprint identification apparatus uses the pressing region as its fingerprint processing region, so as to perform fingerprint identification according to fingerprint data in the fingerprint processing region.

Figure 13:
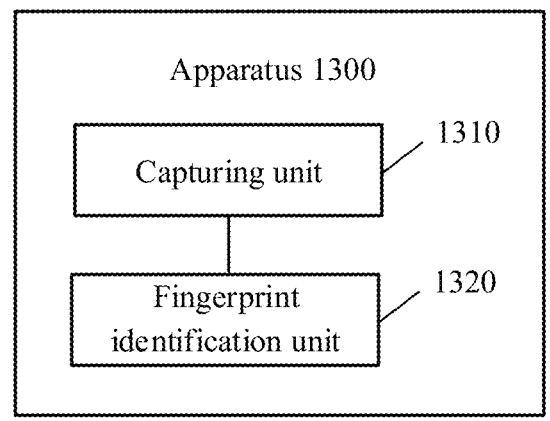
FIG. 13 is a schematic block diagram of an apparatus for fingerprint identification according to an embodiment of the present application.

FIG. 13 is a schematic block diagram of an apparatus for fingerprint identification according to an embodiment of the present application. As shown in FIG. 13, an apparatus 1300 includes a capturing unit 1310 and a fingerprint identification unit 1320.

The capturing unit 1310 is configured to capture an optical signal. The optical signal includes an optical signal, in an illumination region of a display screen, illuminating on a finger and reflected by the finger, the illuminating region is determined according to a pressing region within a fingerprint capturing region in which the finger performs a fingerprint pressing operation, and an area of the illuminating region is not greater than an area of the fingerprint capturing region.

The fingerprint identification unit 1320 is configured to perform fingerprint identification according to the optical signal.

Therefore, when fingerprint identification is performed, an illuminating region of a display screen is determined according to a pressing region for a finger on the display screen, so that a light-emitting unit of the display screen in the illuminating region is used as a light source for fingerprint identification, rather than using light emitting units in the whole fingerprint capturing region as light sources for fingerprint identification, thereby reducing power consumption of the display screen. In addition, by using the light-emitting unit of the display screen in the illuminating region as the light source for fingerprint identification, light leakage generated during fingerprint capturing could be reduced and beauty of an interface is improved.

Optionally, the illuminating region is an elliptical region obtained by performing graphic fitting based on a center point of the pressing region, a long axis of the pressing region and a short axis of the pressing region.

Optionally, the illuminating region is a circular region obtained by performing graphic fitting based on a center point of the pressing region and a long axis of the pressing region.

Optionally, the fingerprint identification unit 1320 is configured to: select fingerprint data in the illuminating region from fingerprint data carried by the optical signal captured in the fingerprint capturing region; and perform fingerprint identification according to the fingerprint data in the illuminating region.

Optionally, the fingerprint identification unit 1320 is configured to: select fingerprint data in the pressing region from fingerprint data carried by the optical signal captured in the fingerprint capturing region; and perform fingerprint identification according to the fingerprint data in the pressing region.

Optionally, the fingerprint capturing region includes sensing regions of at least two fingerprint sensor chips.

Figure 14:
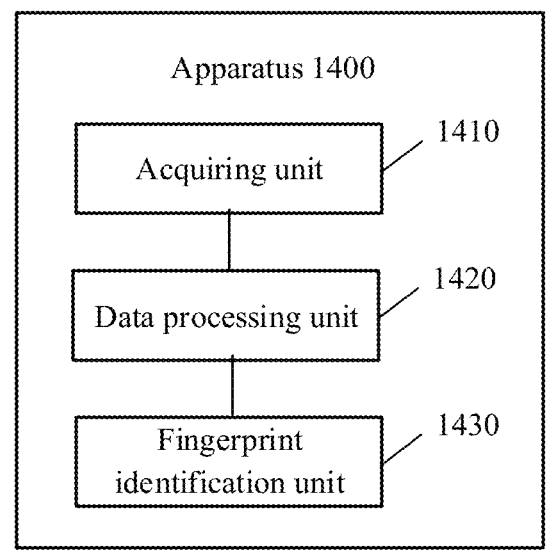
FIG. 14 is a schematic block diagram of an apparatus for fingerprint identification according to an embodiment of the present application.

FIG. 14 is a schematic block diagram of an apparatus for fingerprint identification according to an embodiment of the present application. As shown in FIG. 14, an apparatus 1400 includes an acquiring unit 1410, a data processing unit 1420 and a fingerprint identification unit 1430.

The acquiring unit 1410 is configured to acquire a fingerprint processing region. The fingerprint processing region is determined according to a pressing region within a fingerprint capturing region in which a finger performs a fingerprint pressing operation, and an area of the fingerprint processing region is not greater than an area of the fingerprint capturing region.

The data processing unit 1420 is configured to select fingerprint data in the fingerprint processing region from fingerprint data carried by an optical signal captured in the fingerprint capturing region.

The fingerprint identification unit 1430 is configured to perform fingerprint identification according to the fingerprint data in the fingerprint processing region.

Since the area of the fingerprint processing region is smaller than the area of the fingerprint capturing region, fingerprint data in the fingerprint processing region is selected from fingerprint data in the fingerprint capturing region, and fingerprint identification is performed according to the data in the fingerprint processing region, so that an amount of the fingerprint data processed by the fingerprint identification apparatus is smaller, a fingerprint identification efficiency is enhanced, and user experience is improved.

Optionally, the fingerprint processing region is the pressing region.

Optionally, the fingerprint processing region is an elliptical region obtained by performing graphic fitting based on a center point of the pressing region, a long axis of the pressing region and a short axis of the pressing region.

Optionally, the fingerprint processing region is a circular region obtained by performing graphic fitting based on a center point of the pressing region and a long axis of the pressing region.

Optionally, the fingerprint capturing region includes sensing regions of at least two fingerprint sensor chips.

An embodiment of the present application further provides a terminal device including the fingerprint identification apparatus according to the foregoing various embodiments of the present application.

Optionally, the terminal device further includes an OLED display screen, and a light-emitting layer of the display screen includes a plurality of organic light-emitting diode light sources, where the terminal device employs an organic light-emitting diode light source located in an illuminating region as a light source for fingerprint identification.

Optionally, the terminal device further includes a fingerprint sensor, and the fingerprint sensor is configured to capture an optical signal, in an illumination region of a display screen, illuminating on a finger and reflected by the finger.

By way of example and not limitation, the terminal device may be a portable or mobile computing device such as a mobile phone, a tablet computer, a notebook computer, a desktop computer, a gaming device, an in-vehicle electronic device or a wearable smart device, and other electronic devices such as an electronic database, an automobile and an automated teller machine (ATM). The wearable smart device includes a device such as a smart watch or smart glasses that is full-featured, large-sized, and can implement all or some functions without relying on a smart phone, and a device such as various types of smart bracelets, smart jewelry and other devices for physical signs monitoring that only focuses on a certain type of application function, and needs to cooperate with other devices such as smart phones for use.

It should be noted that specific examples in embodiments of the present application are just for helping those skilled in the art better understand the embodiments of the present application, rather than for limiting the scope of the present application. Those skilled in the art can make various improvements and variations on the basis of the above embodiments, and such improvements or variations are all within the protection scope of the present application.

The foregoing description is only a specific implementation manner of the present application. The protection scope of the present application, however, is not limited here. Various variations or replacements may be readily conceived by any person skilled in the art within the technical scope disclosed in the present application, and such variations or replacements shall fall within the protection scope of the present application. Therefore, the protection scope of the present application shall be subject to the protection scope of the claims.

What is claimed is:

1. A method for fingerprint identification, wherein the method comprises:
    acquiring a fingerprint processing region, wherein the fingerprint processing region is determined according to a pressing region within a fingerprint capturing region in which a finger performs a fingerprint pressing operation, and an area of the fingerprint processing region is smaller than an area of the fingerprint capturing region;
    selecting fingerprint data in the fingerprint processing region from fingerprint data carried by an optical signal captured in the fingerprint capturing region; and
    performing fingerprint identification according to the fingerprint data in the fingerprint processing region.

2. The method according to claim 1, wherein the fingerprint processing region is the pressing region.

3. The method according to claim 1, wherein the fingerprint processing region is an elliptical region obtained by performing graphic fitting based on a center point of the pressing region, a long axis of the pressing region and a short axis of the pressing region.

4. The method according to claim 1, wherein the fingerprint processing region is a circular region obtained by performing graphic fitting based on a center point of the pressing region and a long axis of the pressing region.

5. The method according to claim 1, wherein the fingerprint capturing region comprises sensing regions of at least two fingerprint sensor chips.

6. An apparatus for fingerprint identification, comprising:
    circuitry configured to acquire a fingerprint processing region, wherein the fingerprint processing region is determined according to a pressing region within a fingerprint capturing region in which a finger performs a fingerprint pressing operation, and an area of the fingerprint processing region is smaller than an area of the fingerprint capturing region;
    a data processing circuitry configured to select fingerprint data in the fingerprint processing region from fingerprint data carried by an optical signal captured in the fingerprint capturing region; and
    a fingerprint identification circuitry configured to perform fingerprint identification according to the fingerprint data in the fingerprint processing region.

7. The apparatus according to claim 6, wherein the fingerprint processing region is the pressing region.

8. The apparatus according to claim 6, wherein the fingerprint processing region is an elliptical region obtained by performing graphic fitting based on a center point of the pressing region, a long axis of the pressing region and a short axis of the pressing region.

9. The apparatus according to claim 6, wherein the fingerprint processing region is a circular region obtained by performing graphic fitting based on a center point of the pressing region and a long axis of the pressing region.

10. The apparatus according to claim 6, wherein the fingerprint capturing region comprises sensing regions of at least two fingerprint sensor chips.

11. A terminal device, comprising an apparatus for fingerprint identification, wherein the apparatus comprises:
    circuitry configured to acquire a fingerprint processing region, wherein the fingerprint processing region is determined according to a pressing region within a fingerprint capturing region in which a finger performs a fingerprint pressing operation, and an area of the fingerprint processing region is smaller than an area of the fingerprint capturing region;
    a data processing circuitry configured to select fingerprint data in the fingerprint processing region from fingerprint data carried by an optical signal captured in the fingerprint capturing region; and
    a fingerprint identification circuitry configured to perform fingerprint identification according to the fingerprint data in the fingerprint processing region.

12. The terminal device according to claim 11, wherein the fingerprint processing region is the pressing region.

13. The terminal device according to claim 11, wherein the fingerprint processing region is an elliptical region obtained by performing graphic fitting based on a center point of the pressing region, a long axis of the pressing region and a short axis of the pressing region.

14. The terminal device according to claim 11, wherein the fingerprint processing region is a circular region obtained by performing graphic fitting based on a center point of the pressing region and a long axis of the pressing region.

15. The terminal device according to claim 11, wherein the terminal device further comprises an organic light-emitting diode (OLED) display screen, and a light-emitting layer of the display screen comprises a plurality of organic light-emitting diode light sources, wherein the terminal device employs an organic light-emitting diode light source located in an illuminating region as a light source for fingerprint identification.

* * * * *